United States Patent
Dahan et al.

(10) Patent No.: US 11,414,846 B2
(45) Date of Patent: Aug. 16, 2022

(54) SAFETY VALVE ASSEMBLY FOR DISPENSING LIQUIDS

(71) Applicant: UNITO SMART TECHNOLOGIES LIMITED, Tsuen Wan NT (HK)

(72) Inventors: Yuval-Yoni Dahan, Rishon LeTzion (IL); Abraham Dahan, Rishon LeTzion (IL)

(73) Assignee: UNITO SMART TECHNOLOGIES LIMITED, Tsuen Wan NT (HK)

( * ) Notice: Subject to any disclaimer, the term of this patent is extended or adjusted under 35 U.S.C. 154(b) by 123 days.

(21) Appl. No.: 16/493,577

(22) PCT Filed: Dec. 12, 2017

(86) PCT No.: PCT/IL2017/051339
§ 371 (c)(1),
(2) Date: Sep. 12, 2019

(87) PCT Pub. No.: WO2018/167763
PCT Pub. Date: Sep. 20, 2018

(65) Prior Publication Data
US 2021/0140154 A1    May 13, 2021

(30) Foreign Application Priority Data

Mar. 13, 2017 (IL) .......................................... 251119

(51) Int. Cl.
*E03C 1/04* (2006.01)
*F16K 35/02* (2006.01)

(52) U.S. Cl.
CPC ............ *E03C 1/041* (2013.01); *F16K 35/027* (2013.01); *Y10T 137/9464* (2015.04)

(58) Field of Classification Search
USPC ......................................................... 137/801
See application file for complete search history.

(56) References Cited

U.S. PATENT DOCUMENTS

| | | | | |
|---|---|---|---|---|
| 3,780,758 A | * | 12/1973 | DeVries | F16K 5/12 137/454.6 |
| 4,733,035 A | * | 3/1988 | Ohashi | H01H 13/62 200/43.18 |
| 4,775,101 A | * | 10/1988 | Hall | F16K 17/38 236/48 R |
| 5,364,065 A | * | 11/1994 | Tauati | F16K 35/027 137/606 |

(Continued)

FOREIGN PATENT DOCUMENTS

| | | |
|---|---|---|
| CN | 204901033 U | 12/2015 |
| DE | 202008009127 U1 | 11/2008 |

(Continued)

OTHER PUBLICATIONS

Daalderop BV (DE 202008009127 U1 machine translation (Year: 2008).*

(Continued)

*Primary Examiner* — Daphne M Barry
(74) *Attorney, Agent, or Firm* — Kilpatrick Townsend & Stockton LLP

(57) ABSTRACT

The invention provides a device for safely dispensing liquids, enabling to manage the state of a releasing valve according to the user, for example a vulnerable user such as a child.

16 Claims, 6 Drawing Sheets

(56) References Cited

U.S. PATENT DOCUMENTS

| | | | |
|---|---|---|---|
| 5,871,029 A | 2/1999 | Peteri et al. | |
| 2006/0086394 A1* | 4/2006 | Molina | F16K 11/207 |
| | | | 137/606 |
| 2007/0251587 A1* | 11/2007 | Chen | F16K 11/078 |
| | | | 137/625.4 |
| 2014/0060687 A1* | 3/2014 | Cohen | E03C 1/02 |
| | | | 137/801 |
| 2015/0121616 A1 | 5/2015 | Peteri | |
| 2016/0060853 A1 | 3/2016 | Shapiro et al. | |
| 2018/0217620 A1* | 8/2018 | Tempel | F16K 3/08 |
| 2019/0024820 A1* | 1/2019 | Thurau | F16K 3/24 |
| 2019/0040974 A1* | 2/2019 | Quest | F16K 35/027 |

FOREIGN PATENT DOCUMENTS

| | | |
|---|---|---|
| EP | 2480809 A1 | 8/2012 |
| GB | 442055 A | 1/1936 |
| GB | 2272746 A | 5/1994 |
| NL | 2003205 C2 | 1/2011 |

OTHER PUBLICATIONS

International Application No. PCT/IL2017/051339, International Search Report dated Mar. 26, 2018, 3 pages.
European Patent Application No. EP17900610.1, Extended European Search Report dated Nov. 11, 2020, 8 pages.

\* cited by examiner

Section A-A

Section B-B

Section C-C

SAFETY VALVE ASSEMBLY FOR DISPENSING LIQUIDS

FIELD OF THE INVENTION

The present invention relates to the means for dispensing liquids, particularly potentially dangerous liquids, enabling to manage the state of the valve according to the user, particularly endangered user, such as a child.

BACKGROUND OF THE INVENTION

Many prior valves and faucets with safety devices exist and are designed for specific applications or purposes. For example U.S. Pat. No. 9,422,145 describes an apparatus for hot water faucet, including a stopper engaging the lever, and a spring-loaded pad, such that when the handle and the lever are each independently moved, the stopper constrains the movement of the pad. U.S. Pat. No. 5,470,044 discloses a safety faucet comprising a handle having an opening, a safety sliding block received in the opening on the handle, a casing, and a valve device mounted within the casing, the valve device including a cap fastened to the casing, a valve stem having one end covered with a water stopper and the opposite end extended out of a hole on the cap and pivoted to the handle, and a spring mounted around the valve stem and disposed inside the casing. When the safety sliding block and handle are simultaneously pressed to engage projecting plates, the valve opens the water passage. The known devices are often quite complex. Moreover, the devices do not enable, in a simple way, to distinguish different groups of endangered users who should be precluded from activating the faucet. It is therefore an object of this invention to provide a simple device for dispensing a liquid potentially hazardous for a non-competent user.

It is another object of this invention to provide a device for safely dispensing hot liquids, comprising construction elements necessitating the user to effect more independent movements in order to activate the liquid release.

It is still another object of this invention to provide a safety device for dispensing a liquid potentially hazardous for a non-competent user, comprising construction elements precluding a random release of the liquid or a liquid release by randomly touching the device by a child.

It is a further object of this invention to provide a safety device for dispensing a liquid, comprising construction elements enabling to predetermine the strength of an undesired user to be precluded from dispensing the liquid.

It is a still further object of this invention to provide a safe device for dispensing liquids, precluding predetermined groups of people from dispensing the liquid.

Other objects and advantages of present invention will appear as description proceeds.

SUMMARY OF THE INVENTION

The present invention provides a safety valve device or assembly for dispensing a liquid potentially hazardous for a non-competent user, comprising i) a valve configured to have at least two positions, one of which disables outflow (closed position) and one of which enables outflow (open position) of said liquid from a faucet; ii) a knob having two degrees of movement freedom, one translational and one rotational; iii) an actuating member configured to form actuating contact between said valve and said knob; wherein subsequently effecting said translational and said rotational movement results in switching said valve to said open position. In a preferred embodiment of the invention, effecting said translational movement in the assembly results in creating said actuating contact, which is a contact in which the valve can be opened by one movement, for example rotational. The actuating member and the knob determine a predefined sequence of knob movements required to turn on the valve. The valve is in contact with the actuating member (via parts of the member), and the member is in contact with said knob, when the knob is in its basic state (without effecting said movements); one movement of the knob cannot result in opening the valve at this configuration—that is the knob and the valve are not in actuating contact; only certain movement(s) of said knob result in actuating contact between the knob and the valve, which is a configuration of the knob/member/valve assembly in which one move of the knob can change the valve position to the open position and keep it in said state. The safety valve assembly further comprises shutting means for keeping said valve in the closed position when the knob is left free, it means when the knob is not axially pushed (translationally moved) from its basic position. Achieving said actuating contact thus enables switching the position of said valve from closed to open. The device may comprise various means for keeping the valve in the closed position when the valve is not in actuating contact with said knob, such as when the knob is left free. In one embodiment of the invention, a translational (axial) movement of said knob, such as sliding over a part of the actuating member, results in a translational movement of parts of the member, and a rotational movement of the knob following said translational movement results in rotational movement of some parts of said member; however, other embodiments with different sequence of movements are possible. For example, the knob is provided with internal grooves, which may move over an axial adaptor, constituting a part of said actuating member, provided with external grooves, and a rotational movement of said knob subsequent to said translational movement results in a rotational movement of parts of the member, causing rotational movement of the axis of said valve. In a preferred embodiment of the invention, the translational movement of the knob allows its rotational movement. Said actuating member may be realized in various embodiments; usually the member comprises several parts some of which follow the translational and/or rotational movement of the knob; at least one part of the member usually remains in fixed position. In one embodiment, the member comprises a fixed cylindrical spindle provided with axial grooves on its inner surface, an adaptor comprising axial grooves on its outer cylindrical surface and on its inner surface, and at least two springs. Said actuating member preferably comprises said shutting means. The rotational movement of said knob subsequent to said translational movement preferably results in a movement of parts of the member and in a rotational movement of an axial shaft being a part of said valve. In a preferred embodiment, pushing the knob axially (in a translation movement along the device axis) followed by turning the knob turns parts of said actuating member, resulting in switching said valve to the open position. In one embodiment, said valve, said member, and at least a part of said knob are encased in a cylindrical casing, and said translational movements occur along the axis of the casing cylinder, and said rotational movements occur around the axis of the casing cylinder. In a preferred device according to the invention, said valve, parts of said actuating member, and said knob rotate simultaneously after pushing and turning said knob. Said translational movement is facilitated by sliding means, for example by axial slides or grooves on the outer or on the inner surfaces of said elements, including valve, member, and knob. For example, parts of the actuating member may include axial (parallel to the device axis) slides matching axial grooves on the knob to support the axial move of the knob. The actuating member may comprise a fixed spindle having grooved pattern to lead the knob in predefined movement pattern combining a translational and rotational movement. The device includes means which turn the knob back to its off position when the knob is left free (not touched by the user).

So that, in some embodiments, pushing the knob in the direction of said actuating member, followed by rotating said knob, opens the valve. Said shutting means may comprise, for example, electronic elements and/or mechanical means. In a preferred embodiment of the invention, the device protecting children or other endangered persons from inadvertent outflow of hazardous liquids may be technically very simple. In one embodiment, the mechanical means comprise springs. Said shutting means may comprise a spring which returns the valve to off position when the knob is not pushed (axially) in. Said shutting means may comprise at least two springs, a first spring being deformed during the translational movement of said knob, and a second spring during the rotational movement following said translational movement. In one embodiment, said first spring returns said knob to the initial position and said second spring returns said valve to the initial position, when the knob is not pushed. The springs return the elements to their initial positions, but, advantageously, the spring strength may also further disqualify undesired users from succeeding in releasing the liquid. The invention, thus provides a dispensing device in which the need of at least two different subsequent moves precludes unauthorized liquid release by an incompetent user.

BRIEF DESCRIPTION OF THE DRAWINGS

The above and other characteristics and advantages of the invention will be more readily apparent through the following examples, and with reference to the appended drawings, in which the components need not necessarily be to scale, wherein.

DETAILED DESCRIPTION OF THE INVENTION

A safe valve device or assembly for dispensing a liquid potentially hazardous for the user has been provided, by combining in said assembly elements necessitating two subsequent movements initiated by the user—the first movement comprising linear push onto a knob and the second movement comprising rotating said knob.

The safety valve assembly for dispensing any liquid potentially hazardous for a non-competent user, provided by the invention, preferably comprises a valve configured to have an open position and a closed position—enabling or disabling a flow of the liquid from a faucet, an actuating member in contact with said valve, and a knob with two degrees of movement freedom connected to the actuating member. The actuating member connects the knob with a rotating shaft of said valve and is configured to enforce predefined movement sequence to the knob, enabling the valve opening via creating actuating contact between the knob and the valve.

Figure 4:
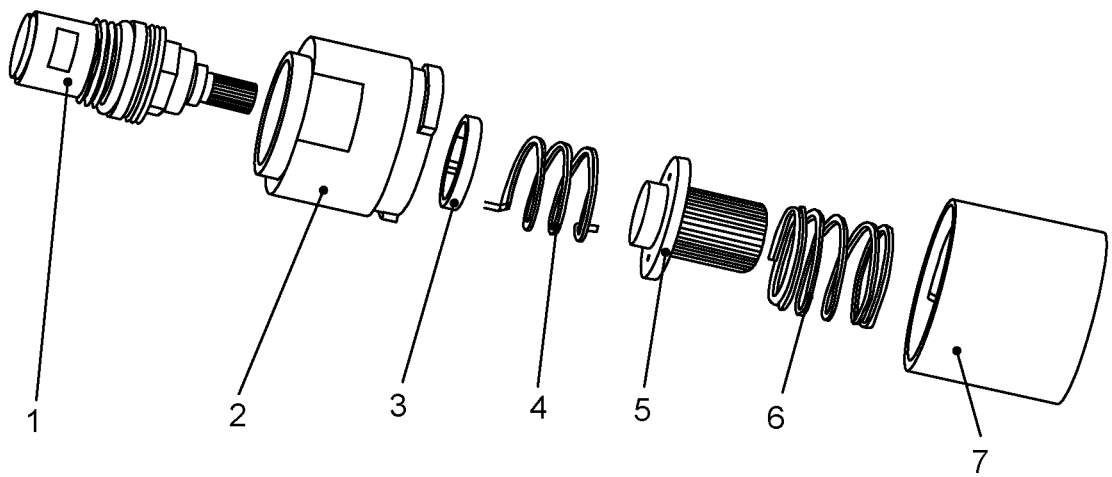
FIG. 4. is an exploded view of a safety valve assembly for dispensing liquids in one embodiment of the invention, comprising standard liquid valve 1, actuating member, and knob 7, whereas the actuating member comprises grooved spindle 2, radial spring holding ring 3, radial spring 4, axial grooved adaptor 5, and axial spring 6.

The unique assembly of the present invention may be, in one embodiment, combined with typical faucets, having one or two operating knobs. The present invention relates generally to operating any liquid valve for dispensing liquid such as hot fluid or in more particular hot water dispatched from faucet or dispensing machine, comprising outer shell (such as knob or alike), actuating member for guiding the movement of the shell or outer knob, and valve. The actuating member may be, in one embodiment, constituted by grooved spindle, radial spring holding ring, radial spring, axial groove adaptor, and axial spring, for example as shown in FIG. 4; the grove spindle is engaged with a pin connected to the outer shell (knob). The grooved spindle is attached to the faucet in a fixed position to prevent its movement, and it guides the pin and the shell/knob in predefined movement path for example a combination of axial movement followed by rotating movement for turning and opening the liquid valve.

The apparatus designed for use with, for example, a typical kitchen faucet, minimizes the possibility of unauthorized use, such as by small children, ill persons, older persons, handicapped persons, or by subjects with otherwise modified abilities; this is achieved by operating the knob in predefined pattern, whereas the predefined pattern prevents the valve opening and liquid dispatching unless the shell or knob moves along the predefined trajectory pattern, preferably combining translation and rotation movements.

The present invention relates to liquid valve attached to shell/knob via mechanism that limit the opening of the valve by requiring the predefined movement of the shell in order to open the valve. The novel apparatus may be used for dispatching any liquid including hot water and was designed especially for the safety of children to prevent their dispatching hot water by mistake. It is further designed as a safety assembly to protect children and others with disabilities from accidentally being exposed to hot water. Hot tap water can burn the skin of small children or even adults. The present invention enforces predefined pattern of the knob in order to open the valve. The novel closure apparatus is designed to fit any typical faucet or dispenser and differentiate the opening of the valve from non-harmful liquid dispatch. A spring or couple of springs may be incorporated into the apparatus for increasing safety by requiring additional force for the operating the knob, and thus preventing inadvertent or accidental use of the water valves (especially for hot water or other hot liquid), and if the hot water accidently starts to be dispatched—returning the knob to its initial position and stopping the liquid flow. A LED or couple of LEDS and buzzer may be incorporated in the apparatus. The LED or buzzer or both will switch on prior to the liquid dispatching to provide further alert to the user from accidental use for example from being harmed by dispatching hot water.

The novel closure apparatus may be coupled with a typical faucet having a one or two operating knobs whereas one or both of the knobs contain the novel apparatus connected to the liquid valve. The novel apparatus may comprise a shell/knob comprising a pin engaged with a guiding grove on a fixed spindle, which is fixed to the faucet or valve body. The groove pattern may have a linear or radial shape, leading the pin and the shell, or other parts of the assembly, in a predetermined fixed pattern, preferably comprising a combination of linear and radial moves, in order to open the liquid valve.

The assembly of the invention may further comprise cam having groves to lead the pivot connected to the knob in the desired pattern. When the mechanism is attached to the knob and faucet valve, it prevents the faucet from being turned on by simply rotating the knob like ordinary knob. The present novel apparatus can be easily operated by an adult or other person authorized to use the faucet. Other embodiments of the present invention include both a first and second optional spring, such that the knob turning or pushing requires adequate force, on one hand, and on the other hand, when the handle/knob is left free, the spring/springs will turn and move the knob back to the initial position, closing the valve and stopping the water flow.

Accordingly, it is the primary object of the present invention to provide a faucet apparatus comprising the combined axial and rotation move to switch the valve to "on" position. Yet another object of the present invention is to provide an apparatus with a light source or buzzer (or both) that turns on the light or buzzer when the knob is in the state "turn on", and turns the light or buzzer off when the valve is in the state "turn off". Turning the light on will provide additional alert about accidentally opened valve. Still another object of the present invention is to provide a faucet for use in kitchen having at least one water valve control handle, comprising the novel apparatus attached to the faucet wherein the faucet knob prevents small children, disabled persons, or others from unauthorized use of the water valve. Another object of the present invention is to provide a knob system where components of the present invention can be made of any suitable materials including polymers, metals, ceramics, glass, wood, and combinations thereof. The knob is provided by means preventing it from being heated by the hot water flowing through the valve. Another object of the present invention is to provide faucet apparatus having a first and a second movements, wherein the first movement is axial and the second is radial, or vice versa. Another object of the present invention is to provide a faucet apparatus having multiple movements changes wherein the faucet knob follows the multiple movement changes to open the liquid valve. Another object of the present invention is to provide faucet apparatus wherein the control knob operates a valve to dispatch a hot water. Another object of the present invention is to provide a faucet apparatus that turns to off position when the handle or the knob is left free. Another object is to provide a faucet apparatus for use with typical faucet having at least one water valve control handle, the novel faucet apparatus comprising a knob with an attached pin, the pin engaged with a grooved spindle and with a liquid valve shaft, wherein the groves on the spindle comprise linear and curved patterns and they support translational and rotational movements; the pin may be attached to the knob and may move inside a groove, enforcing opening the liquid valve, or preventing the valve opening.

Thus using spring force and predefined pattern for opening the valve prevents small children, disabled persons, and an undesired user from unauthorized use of the water valve in an assembly of the invention. The assembly may automatically turn the knob to the closed position and stop dispatching liquid, when the knob is not used.

In one embodiment, a liquid dispenser according to the invention comprises a valve apparatus which is attached to a shell (handle or knob) via actuating member (for opening and closing the valve, whereas the handle or knob movement is limited by the actuating member to move in predefined pattern in order to open the valve. The actuating member may comprise a pin attached to the shall/knob engaged in curved groove on grooved spindle for defining the movement pattern of the pin and hereby the movement of the shell for the purpose of activating the valve. The pattern may include a combination of axial and radial movements, whereby preventing undesired liquid release. The valve mechanism may comprise liquid dispensing faucet or dispensing machine that dispenses liquid when the knob handle opens the valve by following a predefined pattern comprising translational and rotational moves. The valve turns on and off the liquid flow when turning the valve to on (open) or off (closed) position, the liquid being dispensed from the faucet or the dispensing machine. Moving the handle or knob without following the predefined pattern will not turn the valve to "on" position and liquid will not be released. The liquid valve apparatus of the invention may comprise a spring which creates resistance to the axial move as being compressed, and returns the parts to their previous positions. A relatively great spring force may limit the ability of a child to open the valve, while returning the knob/handle back to the initial axial position when the handle is left free. The liquid valve apparatus may further comprise another spring, which creates resistance to a radial or other move, when the spring is deformed by turning the handle, further limiting the child's ability to operate the valve; the spring then rotates the handle back to the initial position when the handle is left free. The liquid valve apparatus of the invention comprises, in a preferred embodiment, at least two springs, wherein when the handle is moved axially or radially, each of the movements deforms at least one spring, and creates resistance to each of the movements of the shell (both axial and radial), thereby limiting the possibility that a child or a handicapped person inadvertently release a potentially hazardous liquid, and returning the shell/knob to its initial position (off position) when the handle is left free.

Said hazardous liquid may comprise hot water, boiling water, hot beverage, or other liquid; said other liquid may comprise potentially damaging materials, such as acids, basis, detergents, or other, which may be utilized for cleaning or for cooking. The liquid valve apparatus of the invention, is in one aspect attached to a faucet for dispensing boiling water or hot water. The liquid valve apparatus of the invention comprises the means for preventing inadvertent liquid release, comprising an element requiring a combination of two or more movements in order to activate a liquid-release valve. A possible pattern for a combination of at least two movements may be subsequent axial (translational) and then radial (rotational) movements, or vice versa. In one embodiment of the invention, a liquid dispensing assembly is provided, which has a means for opening a liquid valve by combining a pattern of three movements, for example a rotation followed by a translation and then a rotation again. The system of the invention enables to easily construct valves which are protected against inadvertent liquid release by a means of an unlimited complexity, entirely precluding a random liquid outflow or activating the flow by a vulnerable person. The liquid valve apparatus of the invention is, in a preferred embodiment, provided with a light source, and eventually a buzzer, that further alerts the user when a potentially hazardous liquid is released. The closure apparatus may comprise a light and/or sound signals for alerting the user in cases when the liquid flows, or when a non-competent or vulnerable person try to operate the system.

Figure 1:
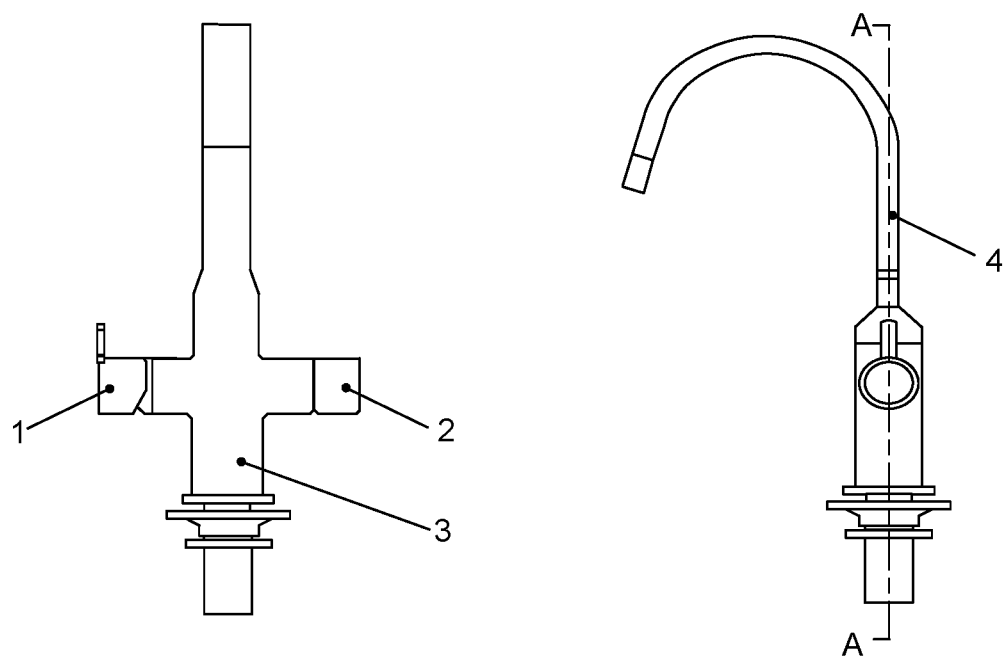
FIG. 1. is one embodiment of a kitchen faucet used with a safe valve assembly according to the invention, including a faucet base 3 spout 4, and liquid valves and knobs of different types 1 and 2, possibly including hot water child safety dispensing knob 2 and cold water dispensing handle 1.
Figure 2:
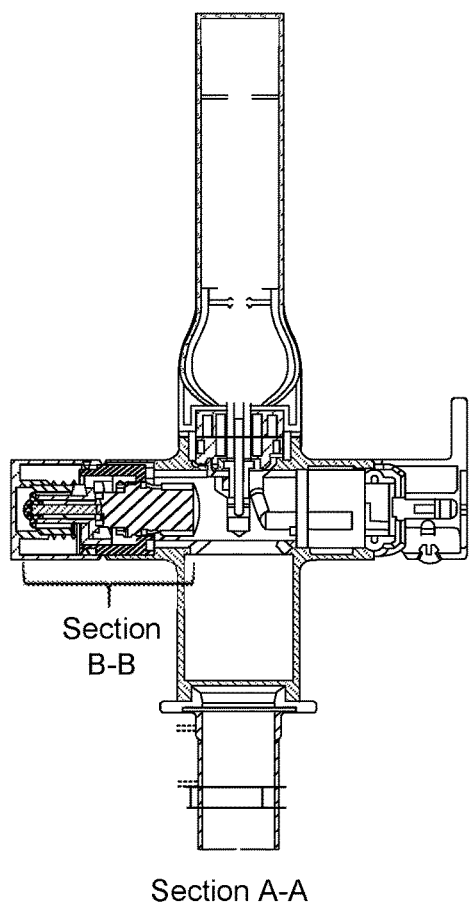
FIG. 2. is a cut view of the faucet as shown in FIG. 1.
Figure 3:
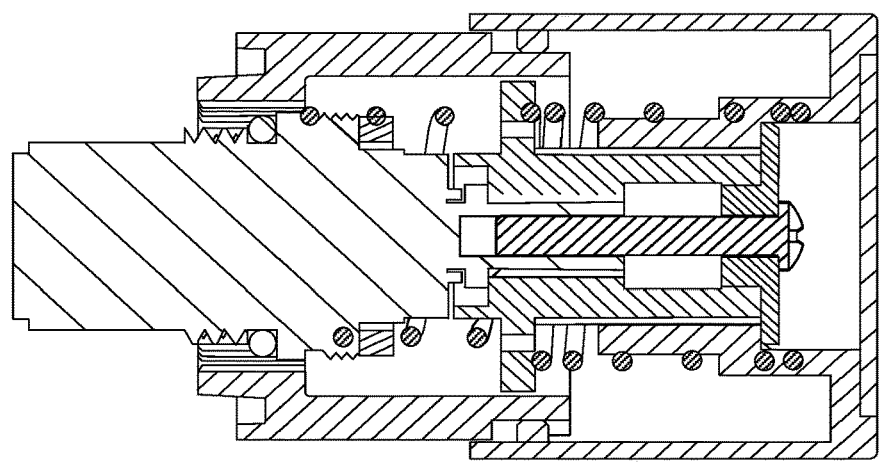
FIG. 3. is a cut view of the apparatus assembly, as seen in FIG. 2, adjusted for a kitchen faucet in its natural position.

Referring now to FIG. 1, the novel assembly is shown in a preferred embodiment, as a kitchen faucet assembly. The faucet assembly includes main body 3, two valve and knob assemblies 1 and 2, on right and left whereas knob 1 is for normal valve operation and knob 2 is for safety dispensing hot water, whereas knobs 1 and 2 are differentiated by their appearance or outer marking, knob 1 includes for example handle for mixing cold and hot water. When opening the valve 1 or 2, a liquid will be dispensed from spout 4. Referring to FIG. 3 the novel apparatus is shown, assembled in natural position, in cross section view. Referring to FIG. 4, it is an exploded view of the internal components of the safety valve assembly for a kitchen faucet (for example such as shown in in FIG. 1) according to one embodiment of the invention. The safety valve assembly comprises valve 1, an actuating member, and knob 7 (for example such as 2 in FIG. 1), whereas the actuating member comprises groove spindle 2, ring 3, radial spring 4, axial groove adaptor 5, and axial spring 6. The spindle is fastened to the body of the valve or to the body of the faucet, so that it cannot move relatively to the body of the valve 1. Outer shell 7 (detailed in FIGS. 5 and 6), serving as knob grip, is engaged via axial groove in its inner side to axial slide adaptor 5 and to the grooved fixed spindle 2 (which can't rotate or move in any direction) as detailed in FIG. 7. The engagement with axial slide adaptor allows the knob to move axially along axial slide adaptor 5. The engagement of knob 7 with grove spindle 2 via pin on the knob enforce the moving cycle of the knob, the knob pin fitting a radial groove (path 2 in FIG. 7) on the spindle. The adaptor comprises grooves on its inner surface which are complementary to the grooves on the outer surface of the valve shaft (2 in FIG. 8). Turning the outer shell 7 will turn the axial slide adaptor 5, as well as the valve shaft. Axial slide adaptor 5 is connected to the valve shaft 2 in FIG. 8, the shaft being inserted into the adaptor; rotating axial slide adaptor 5 by outer shell 7 will eventually rotate the valve shaft and turn it "on" or "off", dispensing the liquid or stopping the liquid flow. When the knob moves in the axial direction, it slides along the slide grooves on the axial slide adaptor 5 as depicted in FIG. 4. When rotating the outer shell, the axial slide adaptor rotates, together with the valve axes rod or shaft (2 in FIG. 8), opening or closing the valve (turning the valve shaft) and allowing the liquid to flow out or stop. Outer shell 7 is also engaged with grooved fixed spindle 2. Since spindle 2 is fixed, the outer shell can only move along the sequence defined on the fixed spindle. In the shown example, the outer shell (knob) must firstly move axially (translation) and then rotate (as shown in FIG. 7, path 2), otherwise the pin in outer shell (1 in FIG. 6) will collide with the pin on the fixed spindle (1 in FIG. 7). The outer shell pin 1 in FIG. 6 can move in the path 2 illustrated in FIG. 7, and thus force the knob to move, attached to the pin, firstly moving in the axial direction, and then rotating the axial slide adaptor 5 in FIG. 4 and the valve shaft. Further referring to FIG. 4, radial (torsion) spring 4 and axial (linear) spring 6 are added to return the knob to its free position when the knob is left free and to automatically close the valve. Radial spring (torsion spring) 4 is optionally attached at one end to the axial slide adaptor 5 in FIG. 4, and at the other end to the fixed spindle 2 in in FIG. 4 via intermediate ring 3 in FIG. 4. By rotating the outer shell, the axial slide adaptor is rotated and spring 4 is twisted when releasing the outer shell, the twisted spring is released and automatically returns to its free position while rotating the outer shell and the valve shaft to their close position. Axial spring 6 in FIG. 4 (compression spring) is optionally located between outer shell 7 and the axial slide adaptor 5. Moving the outer shell in axial direction compresses the spring between the two parts as the axial slider cannot move in axial direction. When releasing the outer shell, spring 6 returns to its free position, moving the outer shell back to its axial free (initial or basic) position.

Figure 5:
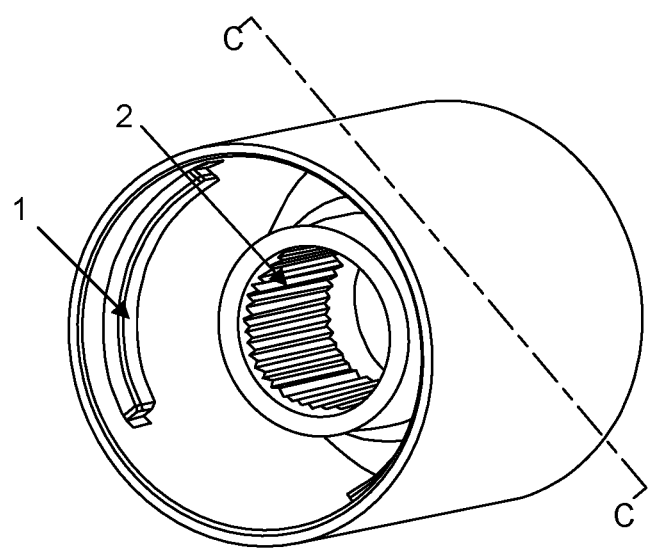
FIG. 5. is a perspective view of the knob (for example knob 7 of FIG. 4), in which a sliding groove 2 allows the knob sliding in an axial movement along the axial grooved adaptor (5 in FIG. 4), and in which pin 1 (internally attached in the knob) is engaged with grooved spindle (2 in FIG. 4) of said actuating member, positioned against pin 1 of the spindle as shown in FIG. 7.
Figure 6:
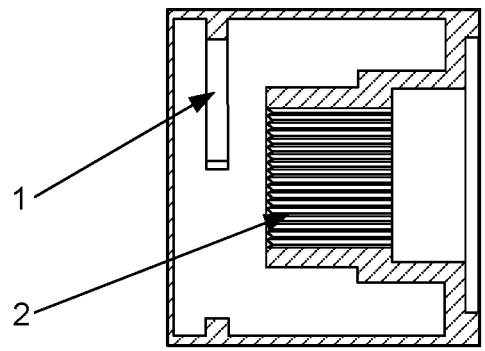
FIG. 6. shows a cross section view of the knob in FIG. 5 with pin 1 and sliding guide 2, matching the slide guides of the axial groove adaptor 5 in FIG. 4.
Figure 7:
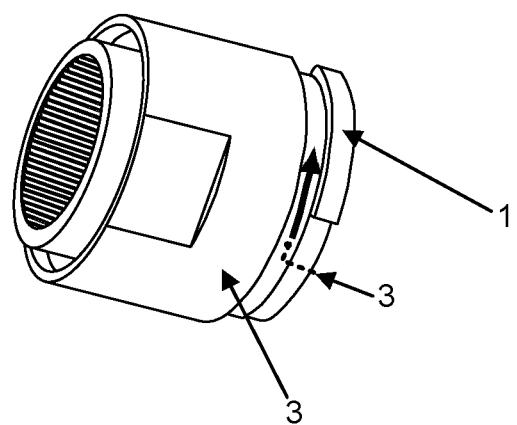
FIG. 7. shows a groove spindle of the actuating member in one embodiment of the invention (see 2 in FIG. 4), comprising grooved pattern 2, and shoulder 1 on the spindle (external pin) which will prevent the rotation of the knob in the device of the invention, such as knob 7 in FIG. 4 (comprising a pin as pin 1 in FIG. 5), unless the knob is pushed first axially as shown by arrow 2.
Figure 8:
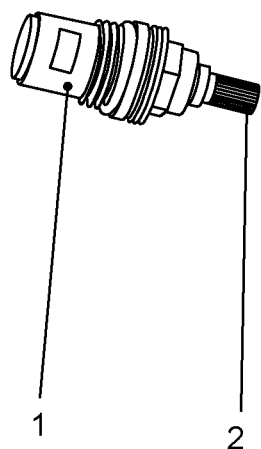
FIG. 8. shows a valve of a valve assembly according to the invention (such as valve 1 in FIG. 4), said valve 1 having shaft 2 whereas rotating the shaft switches the valve on and off.

Referring now to FIG. 5 and FIG. 6 showing the outer shell in detail, and to FIG. 7 showing the fixed spindle in detail, it is clear that simply applying radial force for rotating the outer shell without moving it first in axial direction, it will not be possible to rotate the outer shell. The outer shell pin 1 in FIG. 6 is positioned against fixed spindle pin 1 in FIG. 7. Thus, the outer shell cannot rotate. As a result the valve shaft cannot rotate to the open position. Pushing the outer shell axially leads outer shell pin 1 in FIG. 6 into the groove path and allows the rotation of the outer shell as shown in the path drawn by arrows 2 in FIG. 7. Rotating the outer shell after pushing pin 1 in FIG. 6 into the groove (between spindle body 3 in FIG. 7 and fixed spindle pin 1 in FIG. 7) allows the outer shell rotation, which leads to the rotation of the axial slide adaptor and the valve shaft.

The assembly as exemplified in the figures maintains its safety operation by necessitating the two types of movements one after another, firstly only in the direction of the predefined groove—axially—and subsequently radially, resulting in releasing the liquid by the knob and valve system; only this allows the flow of the liquid, defined as dangerous for some users, such as hot or boiling water, through the spout 4. Springs 4 (radial) and 6 (axial) in FIG. 4 contribute to the safety of the apparatus, requiring adequate force and also adequate order of movements, each of which or both can disqualify an undesired user from activating the faucet; moreover, the simple mechanism which stops the liquid from flowing immediately on releasing the knob contributes still more to the safety of the system, particularly for small children.

Figure 9:
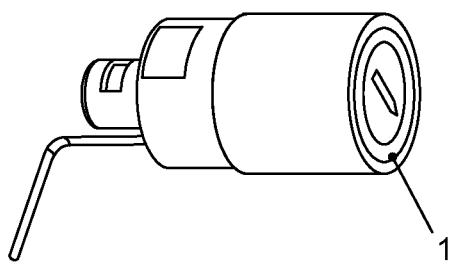
FIG. 9. shows an optional addition to the assembly according to the invention, comprising light warning 1.
Figure 10:
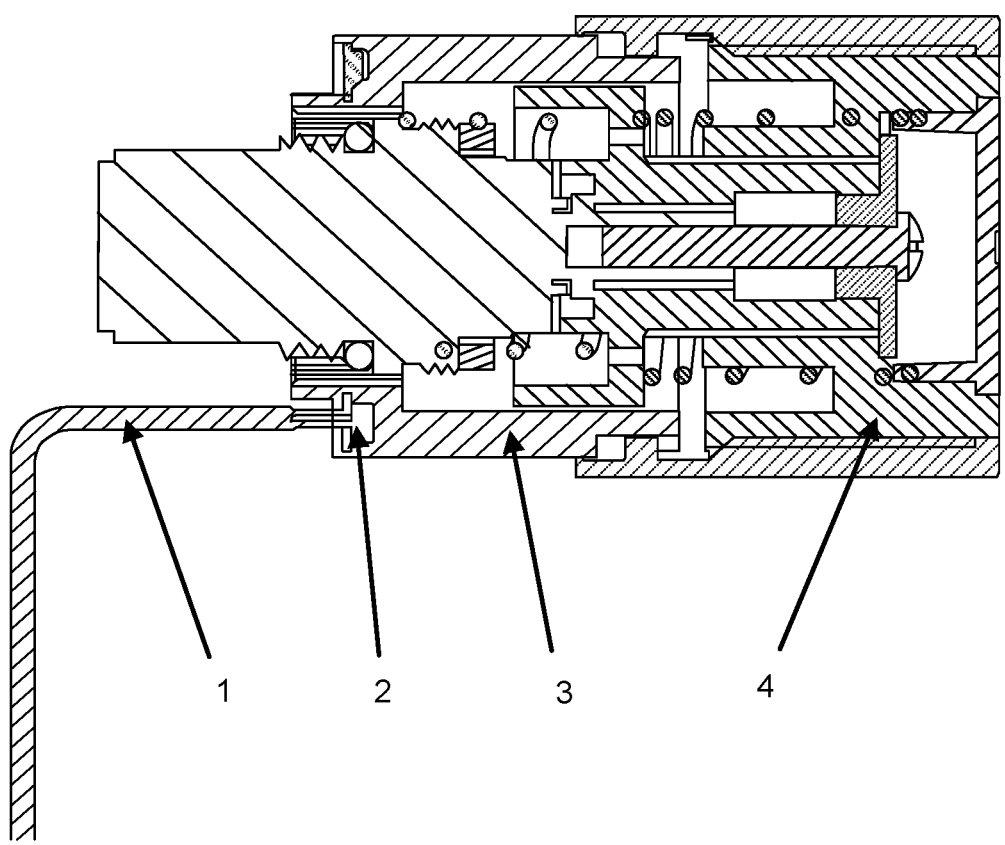
FIG. 10. shows optional arrangements of the assembly according to the invention comprising light warning and optional buzzer; while moving the knob to open the valve of the assembly, the electrical circuit is closed, and the LED light or a buzzer (or both) is turned on (employing electrical wire 1); light guides 3 and 4 (such as optical fibers) guide the LED light beam to the knob surface (such as 1 indicated in FIG. 9).

Referring to FIG. 9 and FIG. 10, in one embodiment of the assembly according to the invention, an additional safety features are added by turning on a light or buzzer while turning the knob according to the predefined groove. FIG. 9 shows the knob in the safety valve assembly according to one embodiment of the invention, comprising light ring 1, turned on when the safety knob turns the valve to the "on" position. The light will alert that liquid flows out. This feature serves as an additional alert and may prevent a non-cautious use of the knob. In another embodiment, a noise alert is activated, such as a buzzer, either with the light or without it. FIG. 9 shows an arrangement, according to one embodiment, of the safety valve with the light option. Power line 1 in FIG. 10. provides power to LED 2. When turning the knob and valve to "on" position, the LED is powered and a light beam spreads through light guides 3 and 4, as shown in FIG. 10, the light guide leading the light beam to the outer surface (1 in FIG. 9).

While this invention has been described in terms of some specific examples, many modifications and variations are possible. It is therefore understood that within the scope of the appended claims, the invention may be realized otherwise than as specifically described.

The invention claimed is:

1. A safety valve assembly comprising
   i) a valve configured to have at least two positions, one of which disables outflow (closed position) and one of which enables outflow (open position) of liquid from a faucet;
   ii) a knob having two degrees of movement freedom, one translational and one rotational;
   iii) an actuating member configured to form actuating contact between said valve and said knob; and
   iv) mechanical shutting means configured to keep said valve in the closed position when the knob is left free, the mechanical shutting means comprising at least two springs that comprise a first spring and a second spring,
   wherein subsequently effecting said translational movement and said rotational movement results in switching said valve to said open position,
   wherein said valve, said actuating member, and at least a part of said knob are encased in a same cylindrical casing,
   wherein said translational movement occurs along an axis of the cylindrical casing,
   wherein said rotational movement occurs around the axis of the cylindrical casing,
   wherein the first spring is deformed during the translational movement of said knob, and
   wherein the second spring is deformed during the rotational movement.

2. The assembly of claim 1, wherein effecting said translational movement results in creating said actuating contact in which the valve can be opened by one rotational movement.

3. The assembly of claim 1, wherein turning said actuating member or a part thereof switches a position of said valve from closed to open.

4. The assembly of claim 1, wherein the rotational movement of said knob subsequent to said translational movement results in a movement of said actuating member or parts thereof and in a rotational movement of a valve shaft of the valve.

5. The assembly of claim 1 whereas the translational (axial) movement of said knob allows its rotational movement.

6. The assembly of claim 1, wherein pushing the knob axially followed by turning the knob turns parts of said actuating member, results in switching said valve to the open position.

7. The assembly of claim 6, wherein said valve, said parts, and said knob rotate simultaneously after pushing said knob axially.

8. The assembly of claim 6, wherein said translational movement is facilitated by axial slides or grooves on outer or inner surfaces of said knob, parts of said actuating member, and the valve.

9. The assembly of claim 1, wherein said knob has shutting means for keeping said valve in the closed position when the knob is left free.

10. The assembly of claim 1, wherein pushing said knob in a direction of said actuating member, followed by rotating said knob, opens the valve.

11. The assembly of claim 1, wherein at least the first spring returns the valve to off position when the knob is left free.

12. The assembly of claim 1, wherein said first spring returns said knob to the axial initial position and said second spring returns said knob to the radial initial position, when the knob is left free.

13. The assembly of claim 1, wherein the actuating member includes axial slides matching axial grooves on the knob to support axial movement of the knob.

14. The assembly of claim 1, wherein the actuating member includes a fixed spindle having grooved pattern to lead the knob in predefined movement pattern combining a translational and rotational movement.

15. The assembly of claim 1, wherein the actuating member includes means to turn the knob back to its off position when the knob is left free and to return the valve to the closed position.

16. The assembly of claim 1, wherein a need of at least two different subsequent moves precludes unauthorized liquid release by an incompetent user.

* * * * *